UNITED STATES PATENT OFFICE.

WILLIAM STANDING, OF DU QUOIN, ILLINOIS.

IMPROVEMENT IN PROCESSES OF PREPARING CORN FOR GRINDING.

Specification forming part of Letters Patent No. 139,743, dated June 10, 1873; application filed February 8, 1873.

*To all whom it may concern:*

Be it known that I, WILLIAM STANDING, of Du Quoin, in the county of Perry and State of Illinois, have invented a new and useful Improvement in Manufacture of Corn-Flour and Corn-Meal, of which the following is a specification:

The object I have in view is to produce a superior article of corn-flour and corn-meal, which I accomplish by subjecting the corn, before it is manufactured, to a steam-drying process with steam of high pressure, and with a thorough ventilation of the grain for the rapid escape of all the moisture that may accumulate in the corn while passing through the drying process; which process I consider absolutely necessary and essential to the preservation of the corn-flour and corn-meal. For so drying and ventilating the grain I prefer a tubular upright boiler, like the steam grain-drier, described in my patent of July 7, 1868.

The best and most suitable corn being selected, it is passed over and through several cleaning-machines, similar to those used in the cleaning of wheat, then it is elevated into the drier, having a capacity of about fifty bushels, more or less. But before the corn is admitted into the drier, the slide or valve, which is placed at the bottom, is closed until the drier is filled, then the valve is opened sufficiently to permit it (the grain) to escape only as fast as it becomes thoroughly dried. The valve is adjustable to suit any circumstances which may conduce to a slower or more rapid rate of drying, as will be fully understood by those skilled in the art to which this invention pertains. The passing of the grain through the drier containing a high pressure of steam, say, from seventy-five to one hundred pounds to the square inch, more or less, with the corresponding temperature, is for the purpose of having the latent heat of the steam penetrate thoroughly the germ, phosphate, dextrine, and starch portion of the corn, as also its oil gluten, and neutralize the strong rank smell and taste peculiar and common to all corn, but more especially in the large starch-bearing kinds.

The high temperature of steam is also for the purpose of expelling every particle of sap and moisture therefrom, whereby the nutriment and saccharine matter contained in the corn may be preserved.

As the corn leaves the drier it is conveyed to and passed over or through machines for the purpose of cooling thoroughly before grinding. The corn is then ground on the best French burrs, somewhat finer than the ordinary style of grinding.

In all of the common or ordinary systems of drying corn the corn is passed over highly-heated surfaces, or through revolving cylinders, accompanied with dry heat and smoke direct from the furnace, or hot air or caloric is forced into or through the main body of the corn. This results in scorching, parching, and contracting the outer coat of the corn, closing the pores of the same, and completely cutting off all the ordinary avenues for the escape of moisture, thereby rendering the corn entirely and totally unfit for flour, or even meal. The moisture, which ought to escape out through the pores of the corn, is thus forced to the center, whereby the center never can get thoroughly dried, although it is really most essential and most important in corn. By this old process the outside or bran also becomes brittle, being scorched and parched so that, when the corn goes through the grinding process, the whole is ground into one general mass, hence the absolute failure heretofore to produce a fine article of flour from Indian corn by any or all of the common or ordinary processes of kiln drying.

Now, in drying corn with steam-heat at a high temperature, I do not wish to be understood, by any means, as steaming the corn before drying it, being convinced that the system of steaming corn is entirely wrong, as much so as the common kiln-drying process. I apply the steam, not preparatory to drying, but for the express purpose of drying the corn, purifying, bleaching, and expelling every particle of moisture and impurities from the corn before it is ground. I apply this steam to the corn under pressure, and a high pressure, because practical experience has shown me that the corn is dried beautifully.

The steam-heat has a tendency to expand and soften the corn, opening all the pores of the same, causing a free passage for the expulsion and for the rapid escape of all the moisture from the center of the corn, hardening the germ, phosphate, and starch portion of the same.

Having thus described my invention, I claim as new and desire to secure by Letters Patent—

The process of drying Indian maize, preparatory to grinding the same, by steam applied under pressure, in the manner and for the purpose described.

WILLIAM STANDING.

Witnesses:
JAMES H. SMITH,
S. M. MOODY.